Dec. 17, 1935.  F. N. BARD  2,024,905
CHECK VALVE
Original Filed Aug. 12, 1929
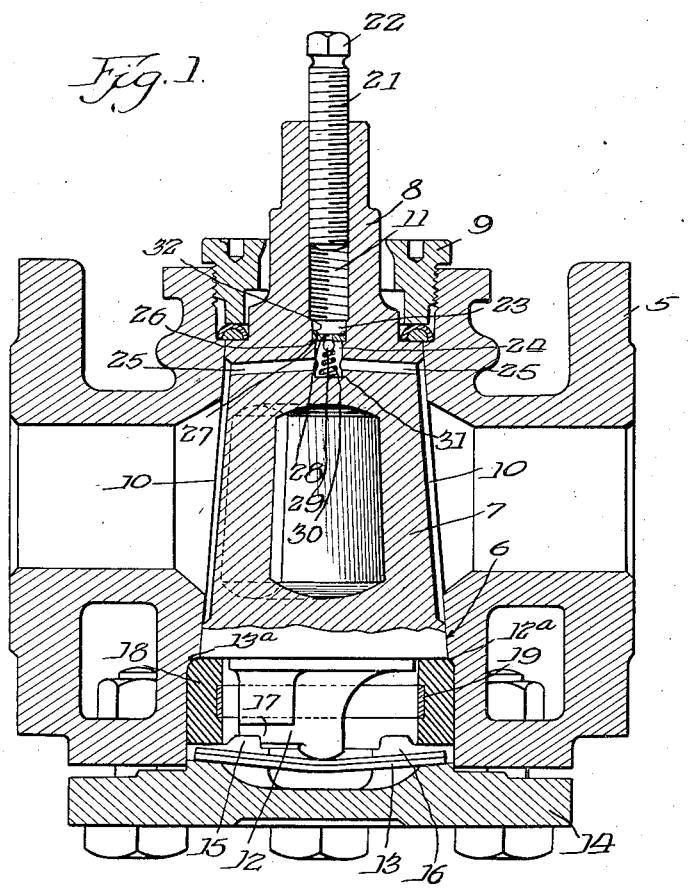
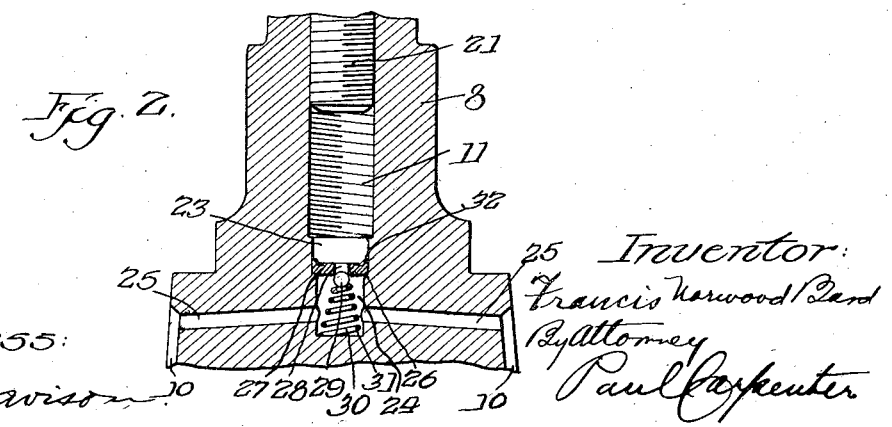

Patented Dec. 17, 1935

2,024,905

UNITED STATES PATENT OFFICE 2,024,905

CHECK VALVE

Francis Norwood Bard, Highland Park, Ill., assignor to Walworth Patents, Inc., Boston, Mass., a corporation of Massachusetts Original application August 12, 1929, Serial No. 385,276. Divided and this application February 29, 1932, Serial No. 595,833

1 Claim. (Cl. 251—121)

This invention relates in general to valves, and more particularly to valves of the rotatable plug type, this application being a division of my application Serial Number 385,276, filed August 12, 1929 (now Patent No. 1,964,782), and this present application being directed more particularly to improvements in check valves for rotatable plug valves, it being understood, however, that the invention finds a wide field of utility for other analogous purposes.

This invention is particularly adapted for incorporation in a rotatable plug valve of the so-called lubricated type on which a chamber is provided containing a lubricant in which compression means is inserted for placing the lubricant under pressure to force it through suitable conduits and grooves in the valve to the surface of contact between the valve and its seat. It is found that in valves of this type there is a tendency for the fluid of the pipe line to force the lubricant back into the compression chamber and thus tend to cause leakage of the valve at this point. Furthermore, this tends to dilute the lubricant, which is undesirable in some instances. Unless some means is provided for preventing this back pressure in the pipe line from reaching the lubricant chamber when a workman removes the compressor screw for replenishing lubricant, there is danger of injury to the workman by hot grease or the like.

This invention has, as one of its principal objects, the provision of an improved means for supplying the lubricant to a lubricated plug valve, more particularly the invention being directed to an improved form of check valve construction for incorporation in the valve structure, preferably at one end of the lubricant chamber for preventing reflux of lubricant into the chamber from the grooves and for preventing back pressure referred to herein and permitting replenishing of the lubricant without danger to the operator; the provision of an improved check valve construction which permits of the insertion of the check valve and its seat by existing machinery and by a substantially single operation; the provision of an improved check valve arrangement for a lubricated plug valve which serves to relieve the plunger from direct pressure from lubricant contained in the valve and thus to eliminate leakage past the plunger; the provision of an improved arrangement of the lubricant passageways adjacent to the check valve so that lubricant passing the valve is not obliged to pass through the convolutions of the spring serving to seat the valve; and the provision of a simplified construction of the check valve permitting reduction in cost of manufacture by eliminating a number of parts heretofore employed for this purpose.

The foregoing and such other objects and advantages as may appear or be pointed out as this description proceeds are attained in the structural embodiment of this invention illustrated in the accompanying drawing, in which:

Figure 1 is a vertical sectional view of a valve embodying improvements of this invention, and Figure 2 is an enlarged fragmentary sectional view showing the improved check valve construction.

Referring now to the drawing, I provide a valve casing 5, a valve seat 6, a plug valve member 7, the latter having a stem 8 and being constructed substantially in accordance with the form of the invention shown in my original application Ser. No. 385,276 (now Patent No. 1,964,782), with the exception that a different style of packing is shown. This packing is more particularly described and claimed in my application, Serial No. 130,365 (now Patent No. 1,778,746), and it will be sufficient to state here that this packing is somewhat yielding in nature so as to cause the valve to be balanced between it and a spring member hereinafter described. A gland 9 retains the packing in position and prevents leakage.

For convenience in describing the invention the check valve structure which will be hereinafter described has been shown as incorporated in the structure of the valve shown in the parent application and it will be understood that this check valve may be employed in connection with plug valves of other specification constructions.

The plug valve member 7 is provided with lubricant grooves 10 and a lubricant chamber 11.

In the form of the invention shown, the bottom of the valve member, that is, the bottom of the plug valve member is provided with a projection 12 which engages a flat spring member 13, the latter being held against rotation on the closure plate 14 by the provision of complemental abutments 15 and 16. The tendency of the spring 13 is to force the valve upwardly by contact with the projection 12 though the valve is susceptible of downward movement, as seen in the figure of the drawing, under the action of lubricant forced between the valve and its seating surfaces.

The projection 12 here is provided with a lateral enlargement 17 which is adapted to engage one or the other of the abutments 15 and 16 which serves as limit stops, that is, "closure stops" for the valve.

In order to seal the space containing the spring 13 and the projection 12 against ingress of fluids from the conduit or the valve, due to leakage at the points 12a and 13a, I provide an annular sealing member 18 which is formed of a resilient material, this annular sealing member 18 having an internal annular armor 19 which reinforces the member 18 and prevents its undue distortion under pressure. The member 18 extends completely around the bottom of the plug valve member and thus forms an effective seal at the points 12a and 13a and is formed of a material which is not readily susceptible to distortion under the effect of caustic and acid solutions.

It will be observed that in the forms of the invention shown, there is a balancing of the valve between the packing at the top of the same and the sealing means for keeping the valve on its seat but serves more particularly as a packing at this point. It will further be understood that the form of the invention shown is for employment in a plug valve wherein the valve is held on its seat by the provision of a flat spring, and the sealing means 18 serves as a seal as well as an auxiliary means for tending to return the valve to its seat. It will be understood, of course, that the member 18, or a slight modification thereof, may be employed in the device of my application Ser No. 243,995 (now Patent No. 1,911,344( without modifying the spring member usually employed in an arrangement such as that shown in this figure.

It will be observed that the stop member carried by the projection on the bottom of the valve engages the abutments 15 and 16 which hold the flat spring member 13 in position and that this arrangement is not in any way interfered with by the provision of the annular sealing means 18. Furthermore, the same abutments which form stops for the quarter turning of the valve also serve to prevent rotation of the spring member on the closure plate.

Referring now to the lubricated portions of the valve and the means for supplying lubricant thereto and the improved check valve construction, it will be observed from the upper portion of the plug member in the drawing that the stem 8 is provided with a lubricant containing internally threaded chamber 11 having arranged therein a threaded cap screw 21 forming a plunger for placing the lubricant contents of the chamber 11 under pressure. The cap screw 21 is provided with a squared head 22 for reception of a suitable tool. The chamber 11 is provided at its bottom with a reduced portion 23 communicating by further reduced portion 24 forming a check valve chamber with radial passageways 25 which communicate with the grooves 10 formed in the surfaces of contact between the valve and its seat. The reduced portion 24 forms an annular shoulder 26 on which rests an aperture plate 27 having an outlet aperture 28. A ball check-valve 29 lies below the plate 27 and a conical coiled spring 30 tends to hold said ball valve 29 against the underside of the outlet 28 for closing the same. The lower end of the coil spring 30 seats in a recess 31 formed in the body of the valve 7.

It is to be observed from an inspection of Figure 2 that the passageways 25 communicate with the reduced portion 24 of chamber 11 so that lubricant passing the check valve 29 under pressure does not pass through the convolutions of the conical coiled spring 30, and that passage of the lubricant is thus not interfered with by the spring, which I believe to be a distinct advantage over the prior art known to me. When thick or relatively heavy lubricants are employed the provision of a check valve and spring in which the lubricant must pass through the convolutions of the spring tends to hinder the free passage of the lubricant and this invention overcomes this disadvantage.

In order to retain the plate 27 in position and to eliminate the necessity for threading or for other expensive formations in the valve, the outer peripheral edge of the plate 27 is spun as indicated at 32 to bring the plate into intimate contact with the side wall of the reduced portion 23 of the lubricant chamber. The edges of the metal disc are compressed into the cast iron or other material of the plug and by means of the spinning or punch-press operation the metal of the disc or plate 27 can be extruded into the metal of the valve thus securely retaining the plate 27 in position. Of course, the coil spring and the valve member are first deposited into position before the spinning operation. This construction, it will be observed, eliminates threading, welding or other expensive methods of holding the disc in position and also eliminates the necessity of employing a separate check-valve unit and making special provision therefor at this point. It will be understood, of course, that, if desired, the edges of the plate or disc 27 may be serrated so as to facilitate the distortion by spinning.

From the foregoing it will be observed that by the provision of the check valve back pressure in the grooves, shown at 10 to be in communication with the transverse passageways in the casing in the event that the valve is left in partly open or partly closed position as shown in the drawing, will be prevented from flowing out through the lubricant chamber in the event that the compressor screw is removed for the purpose of replenishing lubricant, and at the same time where particularly high pressures exist in the pipe line, any tendency for the lubricant to be forced past the compressor screw to atmosphere will be eliminated.

Having thus described my invention and illustrated its use, what I claim as new and desire to secure by Letters Patent is:

In a lubricated plug valve, a valve member having a passageway comprising a pair of communicating compartments separated by an annular shoulder, one of said compartments forming a lubricant reservoir and being threaded for the greater portion of its length leaving a plain unthreaded portion adjacent the shoulder, the other of said compartments being aligned therewith and forming a blind ended check valve chamber, a flat metallic plate seated on said shoulder overlying the valve chamber and having its edge compressed into engagement with the wall of the unthreaded portion of the reservoir, said plate having an axial aperture providing an inlet from the reservoir to the chamber, a peripheral lip portion swaged from the face of said plate adjacent the reservoir into intimate contact with the wall of said unthreaded portion of the reservoir, said plate being retained in position against lubricant pressure chiefly thereby, a check valve element in the chamber for controlling the flow of lubricant through said aperture, a spring engaging said check valve and said blind end of the chamber, and a plurality of transverse outlets opening into the valve chamber to permit egress of lubricant therefrom.

FRANCIS NORWOOD BARD.